(12) United States Patent
Sato et al.

(10) Patent No.: US 11,286,978 B2
(45) Date of Patent: Mar. 29, 2022

(54) TAPERED ROLLER BEARING AND CAGE

(71) Applicant: JTEKT CORPORATION, Osaka (JP)

(72) Inventors: Yuka Sato, Toyonaka (JP); Ichiro Kojima, Nara (JP); Tomoyuki Aida, Kashihara (JP); Atsushi Naitou, Sakai (JP); Kanichi Koda, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/215,256

(22) Filed: Mar. 29, 2021

(65) Prior Publication Data
US 2021/0301866 A1 Sep. 30, 2021

(30) Foreign Application Priority Data
Mar. 31, 2020 (JP) .............................. JP2020-063369

(51) Int. Cl.
*F16C 19/36* (2006.01)
*F16C 33/46* (2006.01)
*F16C 33/66* (2006.01)

(52) U.S. Cl.
CPC ........ *F16C 19/364* (2013.01); *F16C 33/4605* (2013.01); *F16C 33/4676* (2013.01); *F16C 33/6681* (2013.01)

(58) Field of Classification Search
CPC .. F16C 19/364; F16C 33/366; F16C 33/4605; F16C 33/4676; F16C 33/6681
See application file for complete search history.

(56) References Cited

U.S. PATENT DOCUMENTS

| | | | | |
|---|---|---|---|---|
| 4,728,204 | A * | 3/1988 | Colanzi | B61F 15/12 |
| | | | | 384/564 |
| 2015/0049971 | A1* | 2/2015 | Dittmar | F16C 33/4635 |
| | | | | 384/470 |
| 2017/0335886 | A1* | 11/2017 | Kamamoto | F16C 33/6681 |
| 2020/0408260 | A1 | 12/2020 | Kojima et al. | |

FOREIGN PATENT DOCUMENTS

JP 2013-221592 A 10/2013

* cited by examiner

*Primary Examiner* — Phillip A Johnson
(74) *Attorney, Agent, or Firm* — Oliff PLC

(57) ABSTRACT

A tapered roller bearing includes an inner ring, an outer ring, a plurality of tapered rollers, and an annular cage having a plurality of cage pockets. Each of the cage pockets has a retainer configured to permit displacement of the tapered roller in a direction with a component in a radial direction, and restrict detachment of the tapered roller to an outer side in the radial direction by bringing the retainer into contact with a part of an outer peripheral surface of the tapered roller. The cage pockets include a first cage pocket having a first retainer with which a permissible amount of the displacement is a first displacement amount, and a second cage pocket having a second retainer with which the permissible amount of the displacement is a second displacement amount smaller than the first displacement amount.

7 Claims, 13 Drawing Sheets

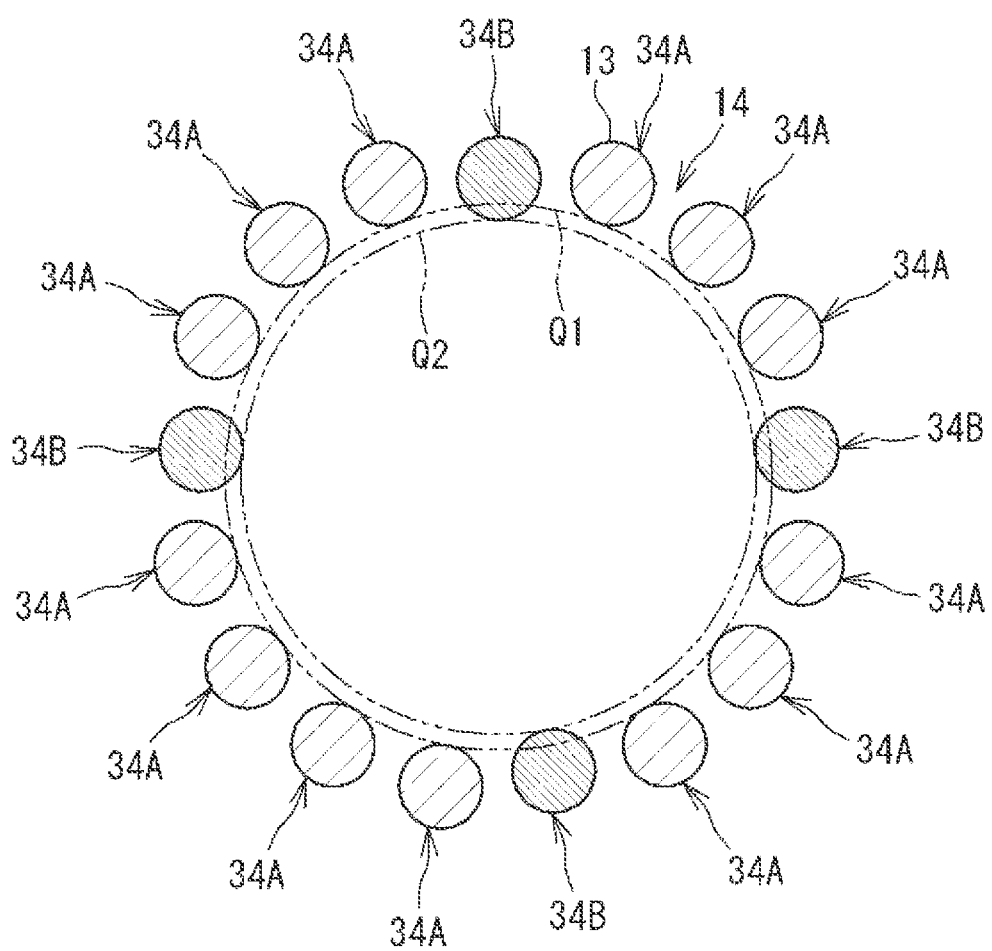

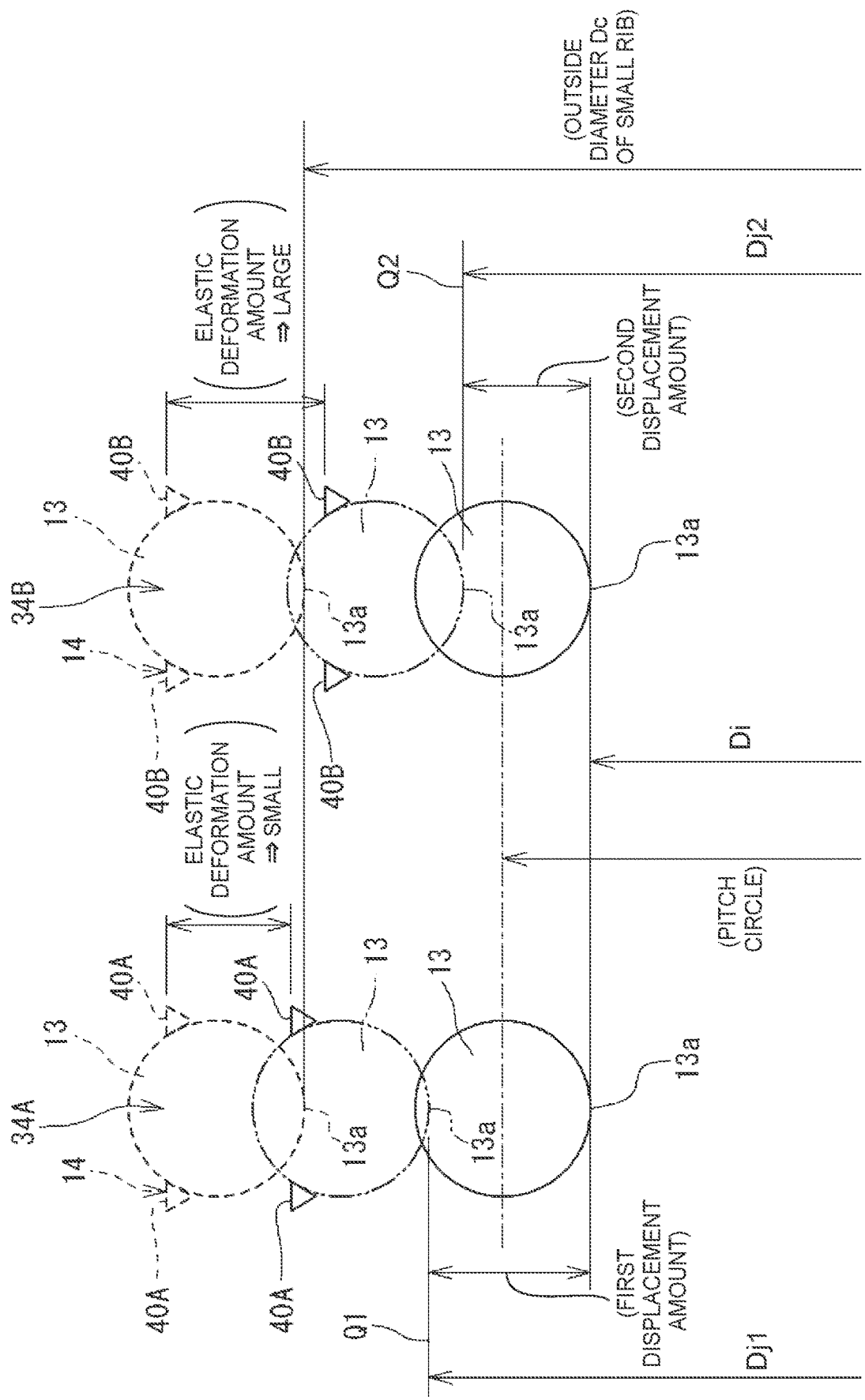

TAPERED ROLLER BEARING AND CAGE

CROSS-REFERENCE TO RELATED APPLICATION

This application claims priority to Japanese Patent Application No. 2020-063369 filed on Mar. 31, 2020, incorporated herein by reference in its entirety.

BACKGROUND

1. Technical Field

The present disclosure relates to a tapered roller bearing and a cage.

2. Description of Related Art

Japanese Unexamined Patent Application Publication No. 2013-221592 (JP 2013-221592 A) discloses a tapered roller bearing. The tapered roller bearing includes an inner ring, an outer ring, a plurality of tapered rollers, and an annular cage. The cage has a plurality of cage pockets that houses the tapered rollers, respectively, thereby retaining the tapered rollers with intervals in a circumferential direction. To prevent the tapered rollers housed in the cage pockets from detaching radially outward when assembling the tapered roller bearing, each cage pocket has a retainer that can be brought into contact with the tapered roller from a radially outer side.

SUMMARY

The tapered roller bearing is assembled as follows. As illustrated in FIG. 12A, tapered rollers 109 are housed in cage pockets 102 of a cage 101 to obtain a set 100 of the tapered rollers 109 and the cage 101. The set 100 and an inner ring 108 are assembled by causing the set 100 to approach the inner ring 108 in an axial direction. In the set 100, a diameter Di of an inscribed circle defined by small-diameter-side portions 109a of the tapered rollers 109 is smaller than an outside diameter Dc of a cone front face rib (hereinafter referred to as "small rib") 107 of the inner ring 108. Therefore, the small-diameter-side portion 109a of each tapered roller 109 needs to climb over the small rib 107 while assembling the set 100 and the inner ring 108 (see FIG. 12B). Thus, the small-diameter-side portion 109a is displaced radially outward. However, the displacement is restricted by a retainer 103 of the cage pocket 102. Accordingly, the operation for assembling the set 100 and the inner ring 108 is not easily achieved.

In view of the above, the small-diameter-side portion 109a of the tapered roller 109 is forced to climb over the small rib 107 by pushing the inner ring 108 in the axial direction against the cage 101 of the set 100 with a great force by using a press or the like. At this time, the tapered roller 109 pushes the retainer 103, and the cage 101 is elastically deformed in a direction in which its diameter increases. Through the assembling method described above, the inner ring 108, the cage 101, and the tapered rollers 109 are integrated into an inner ring unit. An outer ring is attached to the inner ring unit to complete the tapered roller bearing.

When the small-diameter-side portion 109a of the tapered roller 109 climbs over the small rib 107, a considerable force is applied to the cage 101. When the deformation of the cage 101 exceeds its permissible range, the cage 101 may turn white or may be plastically deformed. Further, the cage 101 may be cracked.

In view of the above, the retainer 103 may be downsized or its protruding height may be reduced. Therefore, the permissible amount of the displacement of the tapered roller 109 increases to facilitate the operation for assembling the set 100 and the inner ring 108. In this case, however, the tapered roller 109 can be displaced greatly and the cage 101 can also be displaced greatly in the state of the inner ring unit obtained by assembling the set 100 and the inner ring 108. As a result, the tapered roller 109 of the inner ring unit may climb over the small rib 107 to detach from the cage pocket 102. Thus, the inner ring 108, the tapered rollers 109, and the cage 101 may be disintegrated.

As described above, when the operation for assembling the set 100 and the inner ring 108 is facilitated by, for example, downsizing the retainer 103, the inner ring unit including the inner ring 108, the tapered rollers 109, and the cage 101 is likely to disintegrate. When the disintegration of the inner ring unit is suppressed by, for example, upsizing the retainer 103, the operation for assembling the set 100 and the inner ring 108 is difficult.

The present disclosure provides a tapered roller bearing and a cage that can achieve both facilitation of an operation for assembling an inner ring and a set of a cage and a plurality of tapered rollers, and suppression of disintegration of an inner ring unit obtained by assembling the set and the inner ring.

A tapered roller bearing according to a first aspect of the present disclosure includes an inner ring, an outer ring, a plurality of tapered rollers, and an annular cage. The inner ring has an inner ring raceway on an outer peripheral side, a small rib provided on one side of the inner ring raceway in an axial direction, and a large rib provided on another side of the inner ring raceway in the axial direction. The outer ring has an outer ring raceway on an inner peripheral side. The tapered rollers are in rolling contact with the inner ring raceway and the outer ring raceway. The cage has a plurality of cage pockets that houses the tapered rollers, respectively. Each of the cage pockets has a retainer configured to permit displacement of the tapered roller that is housed in a direction with a component in a radial direction relative to a central axis of the tapered roller bearing, and restrict detachment of the tapered roller to an outer side in the radial direction by bringing the retainer into contact with a part of an outer peripheral surface of the tapered roller. The cage pockets include a first cage pocket and a second cage pocket. The first cage pocket has a first retainer with which a permissible amount of the displacement is a first displacement amount. The second cage pocket has a second retainer with which the permissible amount of the displacement is a second displacement amount smaller than the first displacement amount.

According to the aspect described above, the permissible amount of the displacement with the component in the radial direction is larger in the tapered roller in the first cage pocket than the tapered roller in the second cage pocket. Therefore, when assembling the inner ring and a set of the cage and the tapered rollers, the tapered roller in the first cage pocket can easily climb over the small rib of the inner ring. As compared to a case where all the cage pockets are the second cage pockets in which the permissible amount of the displacement is small, the operation for assembling the set and the inner ring is facilitated. The permissible amount of the displacement with the component in the radial direction is smaller in the tapered roller in the second cage pocket than the tapered roller in the first cage pocket. Therefore, when the set and the inner ring are assembled into an inner ring unit, the tapered roller in the second cage pocket and the cage are hardly displaced relative to each other. As a result, the tapered rollers housed in the cage pockets hardly detach from the inner ring unit, thereby suppressing disintegration of the inner ring unit.

In the aspect described above, the first retainer may have a first clearance in the radial direction from the tapered roller housed in the first cage pocket, and the second retainer may have a second clearance in the radial direction from the tapered roller housed in the second cage pocket. The second clearance is smaller than the first clearance. Thus, the first cage pocket has the first retainer with which the permissible amount of the displacement is the first displacement amount, and the second cage pocket has the second retainer with which the permissible amount of the displacement is the second displacement amount smaller than the first displacement amount.

In the aspect described above, the number of the second cage pockets may be smaller than the number of the first cage pockets. According to this structure, even though the number of the second cage pockets is small, the cage is hardly displaced relative to the inner ring. Since the number of the second cage pockets is small, the operation for assembling the set and the inner ring is facilitated.

In the aspect described above, a plurality of the second cage pockets may be arranged away from each other in a circumferential direction relative to the central axis of the tapered roller bearing with the first cage pocket interposed between the second cage pockets. According to this structure, the cage is hardly displaced relative to the inner ring more securely.

In the aspect described above, the second retainer may be provided on an inner side in the radial direction with respect to the first retainer. Thus, the second cage pocket has the second retainer with which the permissible amount of the displacement is the second displacement amount smaller than the first displacement amount.

The outer peripheral surface of the tapered roller is shaped along a conical surface in which the outside diameter increases toward the other side in the axial direction. Therefore, the second retainer may be provided on the other side in the axial direction with respect to the first retainer. Thus, the second cage pocket has the second retainer with which the permissible amount of the displacement is the second displacement amount smaller than the first displacement amount.

A second aspect of the present disclosure relates to a cage for a tapered roller bearing including an inner ring, an outer ring, and a plurality of tapered rollers. The inner ring has an inner ring raceway on an outer peripheral side, a small rib provided on one side of the inner ring raceway in an axial direction, and a large rib provided on another side of the inner ring raceway in the axial direction. The outer ring has an outer ring raceway on an inner peripheral side. The tapered rollers are in rolling contact with the inner ring raceway and the outer ring raceway. The cage includes a plurality of cage pockets that houses the tapered rollers, respectively. Each of the cage pockets has a retainer configured to permit displacement of the tapered roller that is housed in a direction with a component in a radial direction relative to a central axis of the tapered roller bearing, and restrict detachment of the tapered roller to an outer side in the radial direction by bringing the retainer into contact with a part of an outer peripheral surface of the tapered roller. The cage pockets include a first cage pocket and a second cage pocket. The first cage pocket has a first retainer with which a permissible amount of the displacement is a first displacement amount. The second cage pocket has a second retainer with which the permissible amount of the displacement is a second displacement amount smaller than the first displacement amount.

According to the aspect described above, the permissible amount of the displacement with the component in the radial direction is larger in the tapered roller in the first cage pocket than the tapered roller in the second cage pocket. Therefore, when assembling the inner ring and a set of the cage and the tapered rollers, the tapered roller in the first cage pocket can easily climb over the small rib of the inner ring. As compared to a case where all the cage pockets are the second cage pockets in which the permissible amount of the displacement is small, the operation for assembling the set and the inner ring is facilitated. The permissible amount of the displacement with the component in the radial direction is smaller in the tapered roller in the second cage pocket than the tapered roller in the first cage pocket. Therefore, when the set and the inner ring are assembled into an inner ring unit, the tapered roller in the second cage pocket and the cage are hardly displaced relative to each other. As a result, the tapered rollers housed in the cage pockets hardly detach from the inner ring unit, thereby suppressing disintegration of the inner ring unit.

According to the aspects described above, it is possible to achieve both the facilitation of the operation for assembling the inner ring and the set of the cage and the tapered rollers, and the suppression of the disintegration of the inner ring unit obtained by assembling the set and the inner ring.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5B is a conceptual diagram of a state in which the tapered rollers are displaced when viewed from the one side in the axial direction;

FIG. 10 is a conceptual diagram for describing positions of the tapered rollers in the first cage pocket and the second cage pocket;

DETAILED DESCRIPTION OF EMBODIMENTS

Structure of Tapered Roller Bearing

Figure 1:
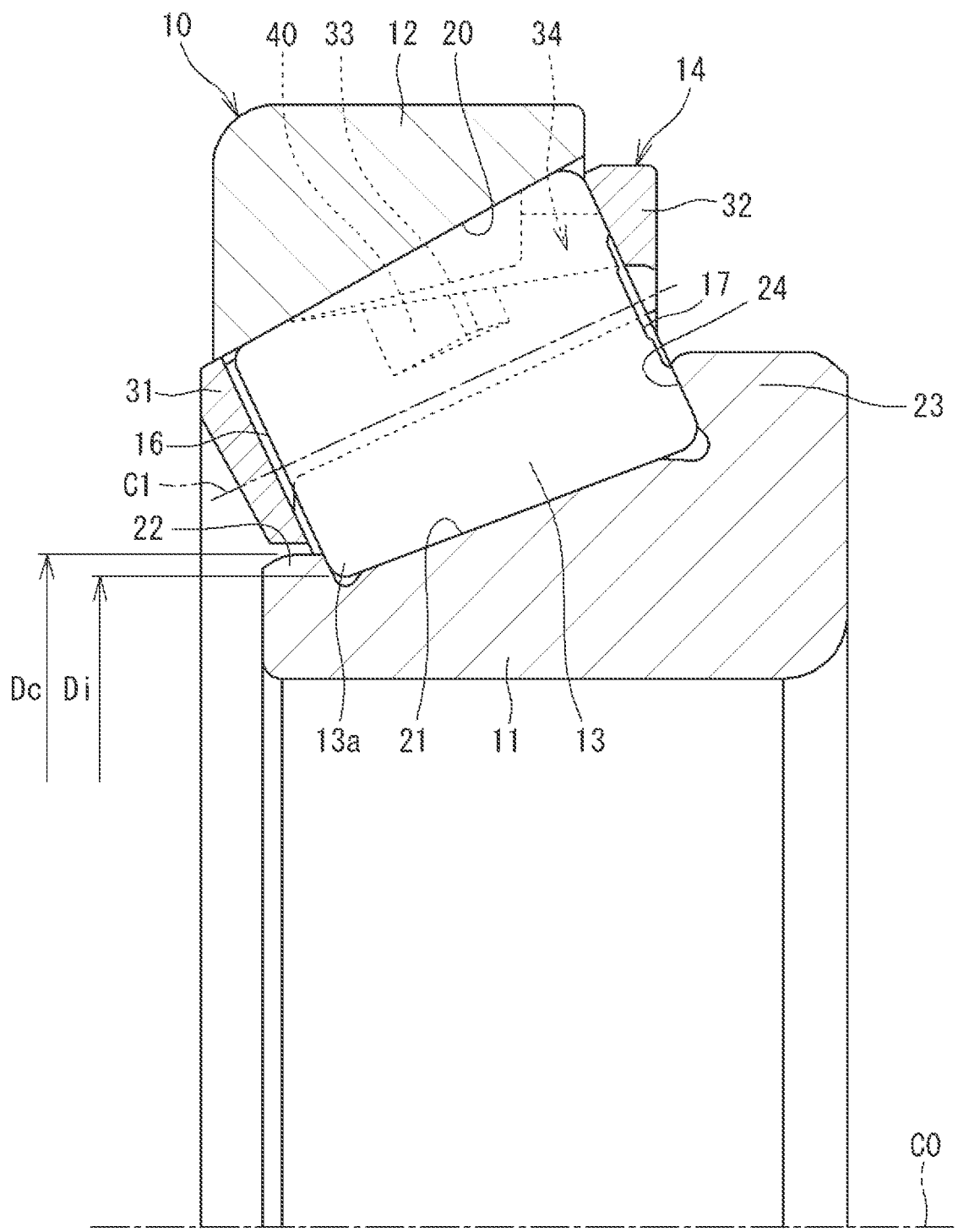
FIG. 1 is a sectional view illustrating an example of a tapered roller bearing.

FIG. 1 is a sectional view illustrating an example of a tapered roller bearing. A tapered roller bearing 10 illustrated in FIG. 1 includes an inner ring 11, an outer ring 12 provided on a radially outer side of the inner ring 11, a plurality of tapered rollers 13 provided between the inner ring 11 and the outer ring 12, and an annular cage 14 that retains the tapered rollers 13.

An "axial direction", a "radial direction", and a "circumferential direction" in the description of the inner ring 11, the outer ring 12, and the cage 14 are defined. The "axial direction" is a direction along central lines of the inner ring 11, the outer ring 12, and the cage 14. The axial direction includes directions parallel to the central lines. The "radial direction" is a direction orthogonal to the central lines. The "circumferential direction" is a direction along a circle about the central lines. In the drawings, the coinciding central lines of the inner ring 11, the outer ring 12, and the cage 14 are represented by reference symbol "C0".

An "axial direction", a "radial direction", and a "circumferential direction" in the description of the tapered roller 13 are defined. The "axial direction" of the tapered roller 13 is a direction along a central line Cl of the tapered roller 13. For distinction from the axial direction of the inner ring 11, the outer ring 12, and the cage 14, the axial direction of the cage 14 and the like may be referred to simply as "axial direction", and the axial direction of the tapered roller 13 may be referred to as "roller axial direction". The roller axial direction includes directions parallel to the central line Cl. The "radial direction" is a direction orthogonal to the central line Cl of the tapered roller 13, and may be referred to as "roller radial direction". The "circumferential direction" is a direction along a circle about the central line Cl of the tapered roller 13, and may be referred to as "roller circumferential direction".

The inner ring 11 is an annular member formed by using, for example, bearing steel or steel for machine structural use. The inner ring 11 has a tapered inner ring raceway 21 on its outer peripheral side. The inner ring 11 has a cone front face rib (hereinafter referred to as "small rib") 22 provided on one side of the inner ring raceway 21 in the axial direction (left side in FIG. 1), and a cone back face rib (hereinafter referred to as "large rib") 23 provided on the other side of the inner ring raceway 21 in the axial direction (right side in FIG. 1). The small rib 22 and the large rib 23 protrude radially outward. In a state in which the tapered rollers 13 are interposed between the inner ring 11 and the outer ring 12 and retained by the cage 14, a diameter Di of an inscribed circle defined by small-diameter-side portions 13a of the tapered rollers 13 is smaller than an outside diameter Dc of the small rib 22.

The outer ring 12 is an annular member formed by using, for example, bearing steel or steel for machine structural use. The outer ring 12 has a tapered outer ring raceway 20 on its inner peripheral side. The tapered roller 13 is a truncated cone-shaped member formed by using, for example, bearing steel. The tapered roller 13 has a circular roller small end face 16 having a small diameter and located on one side in the roller axial direction (left side in FIG. 1), and a circular roller large end face 17 having a large diameter and located on the other side in the roller axial direction (right side in FIG. 1). The tapered roller 13 is in rolling contact with the outer ring raceway 20 and the inner ring raceway 21. The roller large end face 17 is in sliding contact with a face (rib surface) 24 of the large rib 23.

Figure 2:
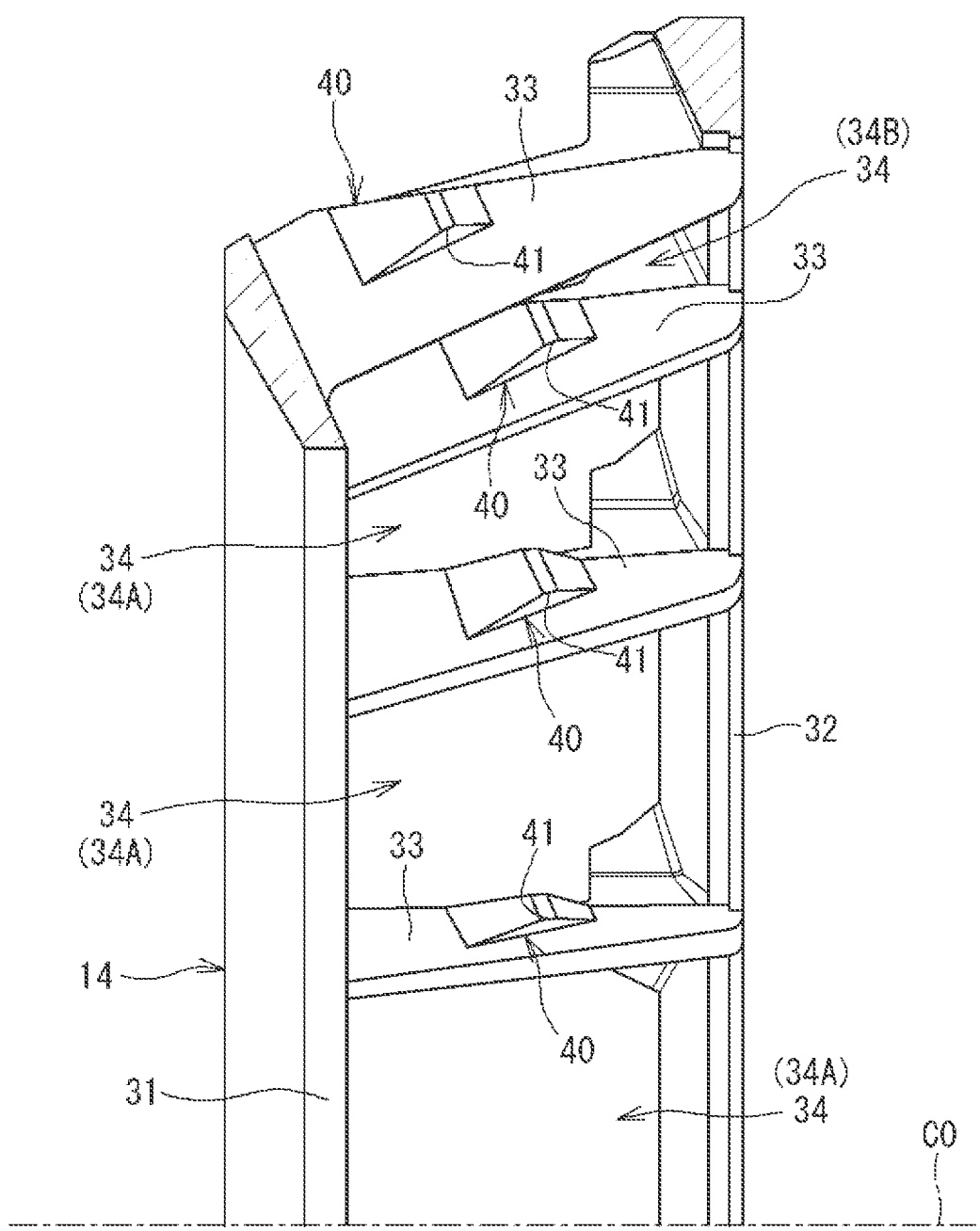
FIG. 2 is an explanatory drawing of a part of a cage viewed from its inner peripheral side.

FIG. 2 is an explanatory drawing of a part of the cage 14 viewed from its inner peripheral side. The cage 14 includes a small-diameter annular body 31 on one side in the axial direction, a large-diameter annular body 32 having an outside diameter larger than that of the small-diameter annular body 31 and located on the other side in the axial direction, and a plurality of cage bars 33 provided with intervals in the circumferential direction. The small-diameter annular body 31 and the large-diameter annular body 32 have a ring shape, and are provided away from each other in the axial direction. The cage bars 33 couple the small-diameter annular body 31 and the large-diameter annular body 32. A space formed between the small-diameter annular body 31 and the large-diameter annular body 32 and between two cage bars 33 and 33 adjacent in the circumferential direction is a cage pocket 34. Each cage pocket 34 houses one tapered roller 13. The cage 14 has a plurality of cage pockets 34 that houses the tapered rollers 13, respectively, thereby retaining the tapered rollers 13 with equal intervals in the circumferential direction.

The cage 14 is made of a synthetic resin, and is formed by injection molding. For example, the cage 14 of this embodiment is made of a polyphenylene sulfide resin (PPS). The cage 14 is resistant to lubricating oil (oil resistance), relatively hard, and hardly deformed elastically. The cage 14 may be manufactured by using a 3D printer. In the present disclosure, the cage 14 can be brought into sliding contact with a part of the inner peripheral surface of the outer ring 12, and accordingly rotation of the cage 14 is guided by the outer ring 12. That is, the tapered roller bearing 10 illustrated in FIG. 1 is an outer-ring guide type bearing in which the cage 14 is guided by the outer ring 12.

Figure 3:
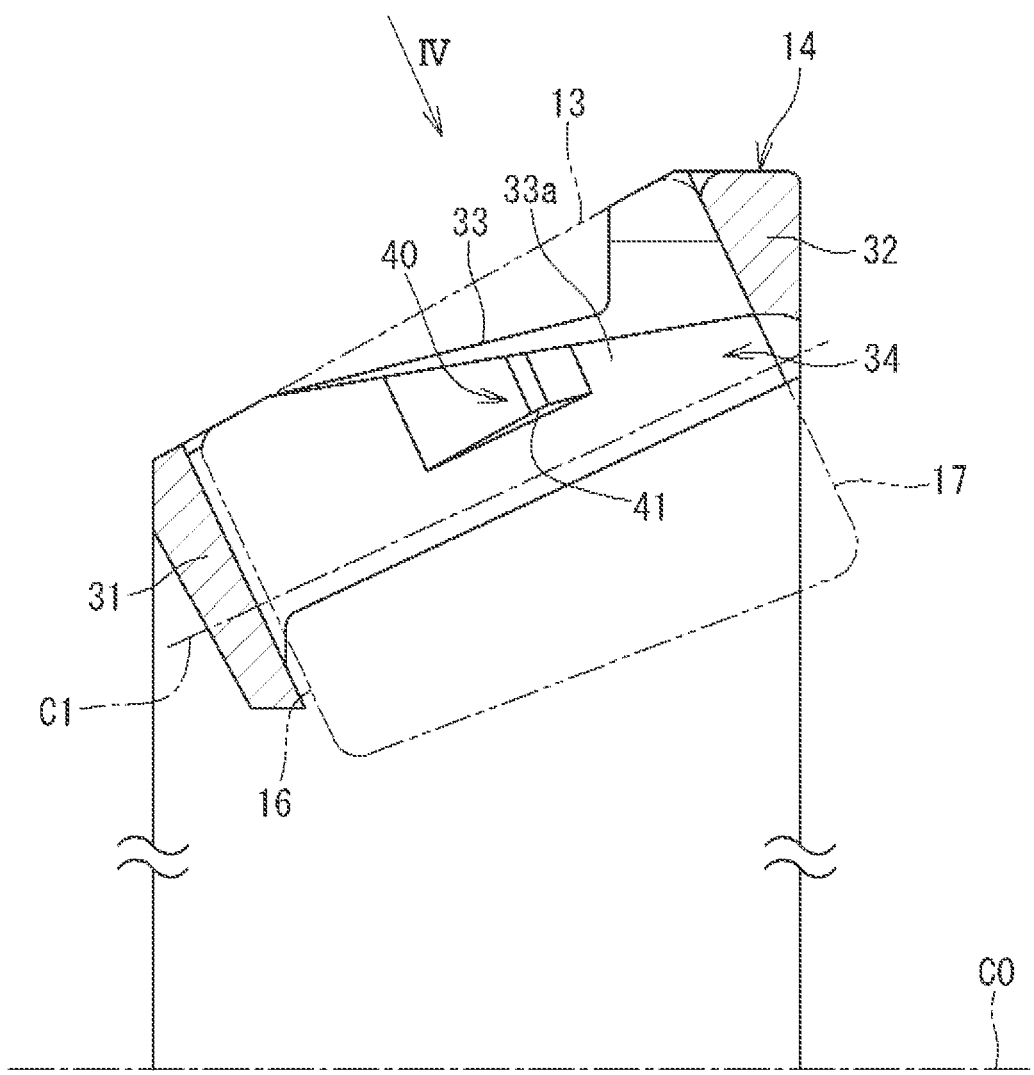
FIG. 3 is a diagram illustrating a cross section including a central line of the cage.
Figure 4:
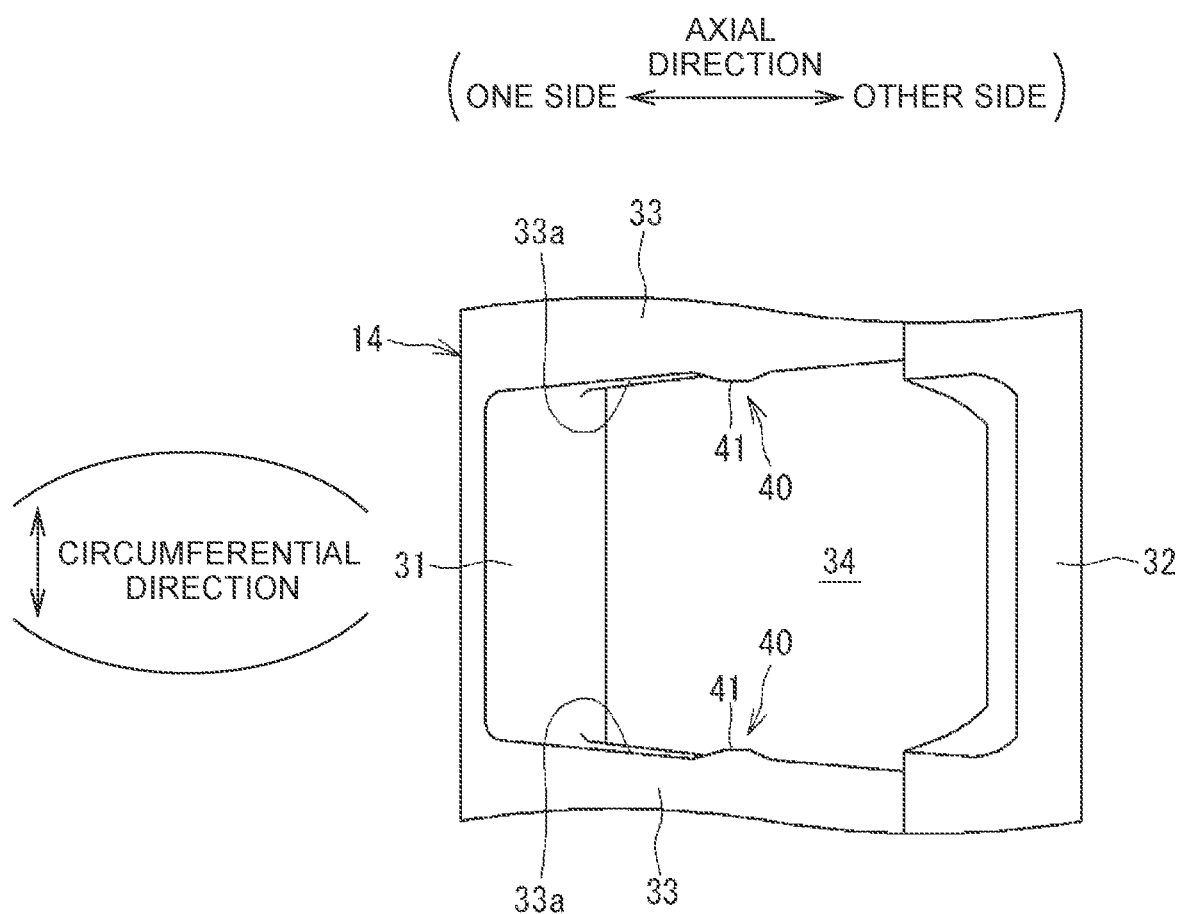
FIG. 4 is a diagram viewed along an arrow IV in FIG. 3.

FIG. 3 is a diagram illustrating a cross section including the central line of the cage 14. FIG. 4 is a diagram viewed along an arrow IV in FIG. 3. Each cage pocket 34 has retainers 40 configured to prevent radially outward detachment of the housed tapered roller 13. The retainers 40 are provided on both sides of one cage pocket 34 in the circumferential direction. Each retainer 40 is provided in a middle area in the axial direction on a face 33a of the cage bar 33, and protrudes in the circumferential direction. The retainer 40 is brought into contact with a part of the outer peripheral surface of the tapered roller 13 housed in the cage pocket 34 (middle part in the roller axial direction). A portion around a crest 41 of the retainer 40 is brought into contact with a part of the outer peripheral surface of the tapered roller. Thus, the radially outward detachment of the tapered roller 13 from the cage pocket 34 is prevented when the tapered roller bearing 10 is assembled as described later. The retainer 40 may have a shape other than the shape illustrated in FIG. 3 and FIG. 4. As described later, the cage 14 has two types of cage pocket 34 (first cage pocket 34A and second cage pocket 34B) due to a difference in either or both of shapes and arrangements of the retainers 40.

As illustrated in FIG. 1, a state in which the central line of the cage 14 coincides with the central line of the inner ring 11 and the tapered rollers 13 retained by the cage 14 are properly in contact with the inner ring raceway 21 and the face 24 of the large rib 23 is defined as a "reference state". In the reference state and also in a state in which each tapered roller 13 is in contact with the outer ring raceway 20, the tapered roller 13 is not displaceable in the roller radial direction and the roller axial direction. A clearance is provided between the roller small end face 16 of the tapered roller 13 and the small-diameter annular body 31. A clearance is also provided between the outer peripheral surface of the tapered roller 13 and the retainers 40. Therefore, the cage 14 is slightly displaceable in the radial direction and the axial direction relative to the tapered roller 13, and the tapered roller 13 is slightly displaceable in the axial direction and the radial direction in the reference state in which the outer ring 12 is removed (see FIG. 9B).

In the reference state, an imaginary circle connecting the centers of the roller small end faces 16 of the tapered rollers 13 is defined as a small-diameter-side pitch circle of the tapered rollers 13 (in design), and an imaginary circle connecting the centers of the roller large end faces 17 of the tapered rollers 13 is defined as a large-diameter-side pitch circle of the tapered rollers 13 (in design). An assembly in a state in which the tapered rollers 13 are housed in the cage pockets 34 of the cage 14 (see FIG. 8A) is a "set 50" of the cage 14 and the tapered rollers 13. An assembly of the set 50 and the inner ring 11 (see FIG. 9B) is an "inner ring unit 51".

In each of the set 50 and the inner ring unit 51, the tapered rollers 13 are arranged along the small-diameter-side pitch circle and the large-diameter-side pitch circle unless otherwise noted. In the present disclosure, this state may be described simply as a state in which the tapered rollers 13 are arranged "along pitch circle". Each tapered roller 13 is slightly displaceable with a radially outward component until the tapered roller 13 arranged along the pitch circle is brought into contact with the retainers 40. Unless otherwise noted, the tapered rollers 13 are arranged along the pitch circle.

Cage Pocket 34

As described above, the cage 14 has the cage pockets 34. Each of the cage pockets 34 has a set of retainers 40 and 40 in pairs. In each of the set 50 and the inner ring unit 51, a clearance is formed between the small-diameter annular body 31 and the roller small end face 16 of the tapered roller 13 in a state in which the roller large end face 17 of the tapered roller 13 is in contact with the large-diameter annular body 32. In each of the set 50 and the inner ring unit 51, when the tapered roller 13 arranged along the pitch circle is displaced with the radially outward component, the retainers 40 and 40 are brought into contact with a part of the outer peripheral surface of the tapered roller 13 from a radially outer side. Therefore, radially outward detachment of the tapered roller 13 is prevented.

In each of the set 50 and the inner ring unit 51, a radial clearance is formed between each of the retainers 40 and 40 and the tapered roller 13 located along the pitch circle and housed in the cage pocket 34. Therefore, the retainers 40 and 40 permit displacement of the tapered roller 13 with a radial component. Although the retainers 40 and 40 of the cage pocket 34 permit the displacement of the housed tapered roller 13 with the radial component, the retainers 40 and 40 are brought into contact with a part of the outer peripheral surface of the tapered roller 13 when the tapered roller 13 is displaced. Thus, the radially outward detachment of the tapered roller 13 can be prevented.

The displacement of the tapered roller 13 with the radial component includes not only linear displacement of the tapered roller 13 that moves radially outward but also, as described later, displacement in which the tapered roller 13 is brought into contact with a part of the retainer 40 during assembling and the small-diameter-side portion 13a of the tapered roller 13 pivots radially outward about the contact position. In the set 50, the roller small end face 16 is brought into contact with the small-diameter annular body 31 when the tapered roller 13 is pivotally displaced. Therefore, the pivotal displacement of the tapered roller 13 is restricted by the retainer 40 and the small-diameter annular body 31. The small-diameter annular body 31 has a uniform shape (sectional shape) along the circumferential direction. As described later, the cage 14 has two types of cage pocket 34 (first cage pocket 34A and second cage pocket 34B) different in either or both of shapes and arrangements of the retainers 40. Due to the difference in the retainers 40, permissible amounts of the pivotal displacement of the tapered rollers 13 differ from each other.

Figure 5A:
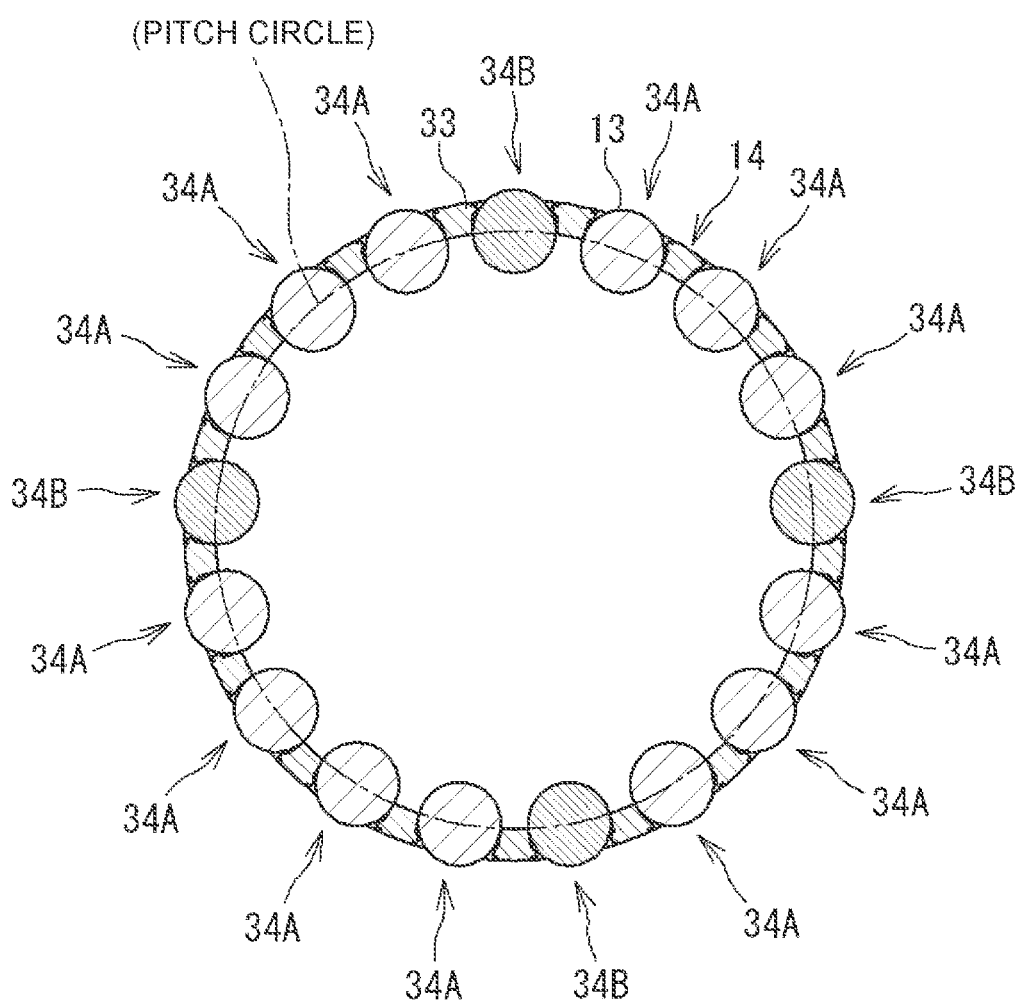
FIG. 5A is a conceptual diagram of the cage and tapered rollers viewed from one side in an axial direction.

FIG. 5A is a conceptual diagram of the cage 14 and the tapered rollers 13 viewed from one side in the axial direction. FIG. 5A illustrates a state in which the tapered rollers 13 are arranged along the pitch circle. The cage 14 has two types of cage pocket 34. That is, the cage pockets 34 include first cage pockets 34A and second cage pockets 34B. In FIG. 5A, the tapered roller 13 in the first cage pocket 34A and the tapered roller 13 in the second cage pocket 34B are hatched and distinguished from each other by varying the density of hatching. In the form illustrated in FIG. 5A, the cage 14 has a total of 17 cage pockets 34, in which four cage pockets 34 are the second cage pockets 34B and the remaining 13 cage pockets 34 are the first cage pockets 34A. The number of second cage pockets 34B is preferably equal to or larger than three, and is preferably smaller than the number of first cage pockets 34A. The plurality of (four in the illustrated example) second cage pockets 34B is arranged away from each other along the circumferential direction of the cage 14 with one or more (three or four in the illustrated example) first cage pockets 34A interposed between the second cage pockets 34B. The second cage pockets 34B are arranged equiangularly in the circumferential direction if possible. Three or more types of cage pocket 34 may be provided. In this case, the forms of the retainers 40 differ from one another.

Figure 6:
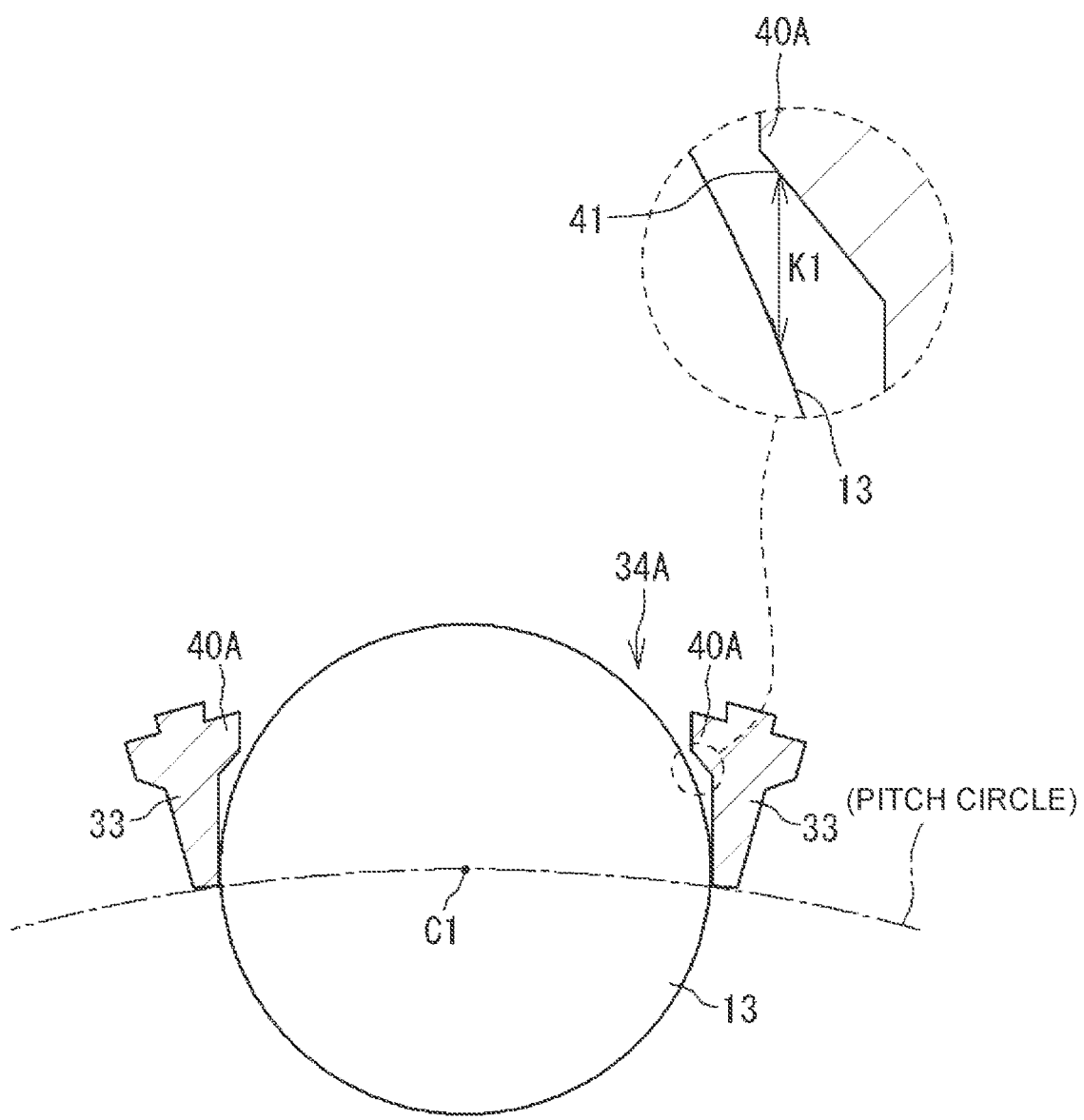
FIG. 6 is an explanatory drawing of a first cage pocket viewed along a roller axial direction.
Figure 7:
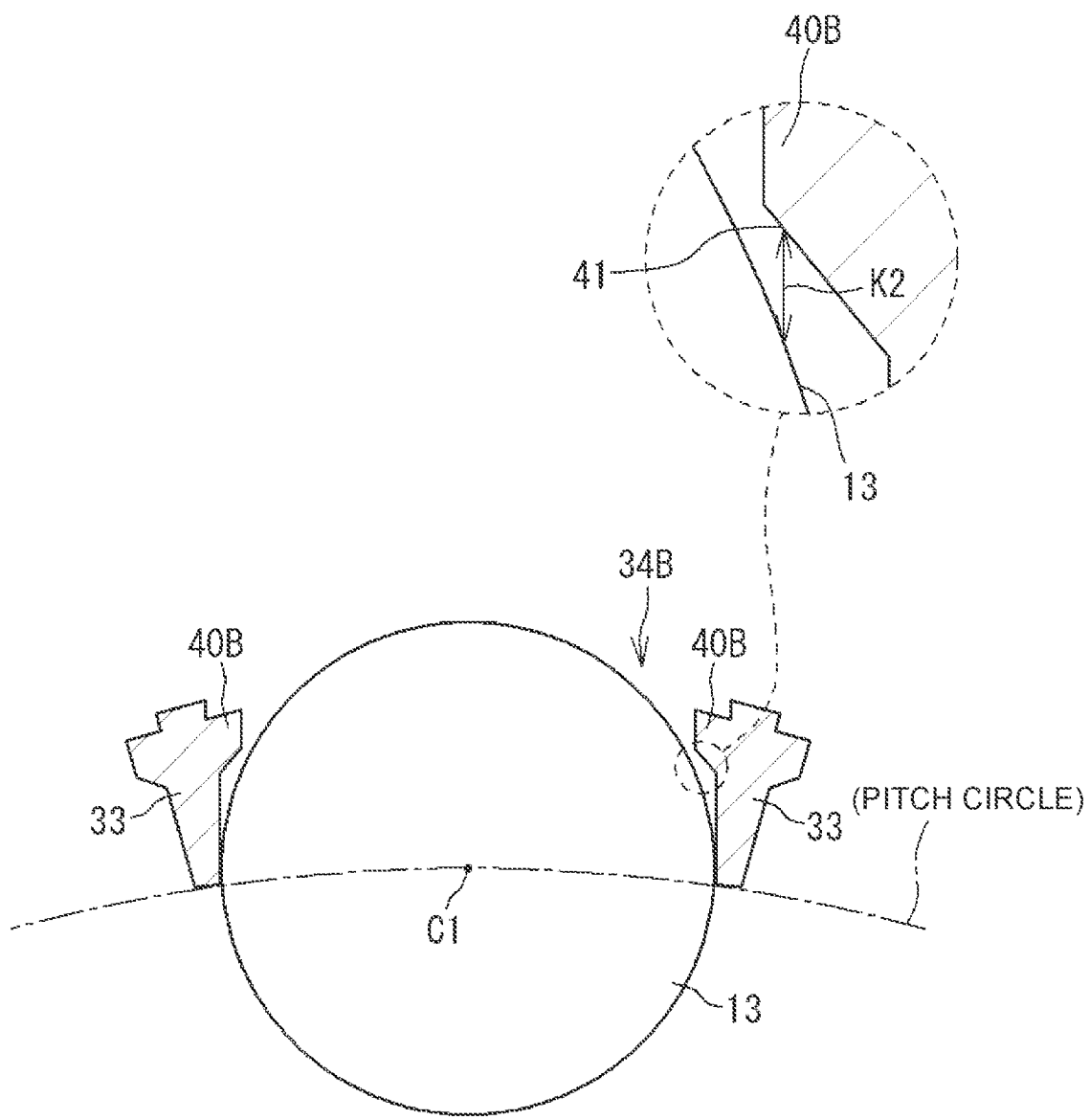
FIG. 7 is an explanatory drawing of a second cage pocket viewed along the roller axial direction.

FIG. 6 is an explanatory drawing of the first cage pocket 34A viewed along the roller axial direction. The retainers 40 provided in the first cage pocket 34A are "first retainers 40A". FIG. 7 is an explanatory drawing of the second cage pocket 34B viewed along the roller axial direction. The retainers 40 provided in the second cage pocket 34B are "second retainers 40B". FIG. 6 and FIG. 7 illustrate a state in which the tapered roller 13 is located along the pitch circle (reference state).

In FIG. 6, a first clearance K1 in the radial direction of the cage 14 is provided between the first retainer 40A and the tapered roller 13 located along the pitch circle. The first clearance K1 is a clearance at a position where the first retainer 40A can be brought into contact with the tapered roller 13. With the first clearance K1, displacement of the tapered roller 13 with a radial component is permitted in the first cage pocket 34A. A permissible amount of this displacement is referred to as "first displacement amount". The first displacement amount may be regarded as a displaceable amount of the tapered roller 13 located along the pitch circle.

In FIG. 7, a second clearance K2 in the radial direction of the cage 14 is provided between the second retainer 40B and the tapered roller 13 located along the pitch circle. The second clearance K2 is a clearance at a position where the second retainer 40B can be brought into contact with the tapered roller 13. With the second clearance K2, displacement of the tapered roller 13 with a radial component is permitted in the second cage pocket 34B. A permissible amount of this displacement is referred to as "second displacement amount". The second displacement amount may be regarded as a displaceable amount of the tapered roller 13 located along the pitch circle. The present disclosure provides a relationship in which the second clearance K2 is smaller than the first clearance K1 (K2<K1). Therefore, the "second displacement amount" is smaller than the "first displacement amount". Regarding a positional relationship in the axial direction of the cage 14, the position where the first retainer 40A can be brought into contact with the tapered roller 13 and the position where the second retainer 40B can be brought into contact with the tapered roller 13 may coincide with each other but may be shifted from each other.

In order that the second displacement amount may be smaller than the first displacement amount, the cage 14 of the present disclosure has at least one of the following first and second structures.

First structure: The contact position of the second retainer 40B with the tapered roller 13 (crest 41 of the retainer 40 near the contact position) is provided on an inner side in the radial direction of the cage 14 with respect to the contact position of the first retainer 40A.

Second structure: The contact position of the second retainer 40B with the tapered roller 13 (crest 41 of the retainer 40 near the contact position) is provided on the other side in the axial direction of the cage 14 with respect to the contact position of the first retainer 40A.

Supplemental description is given about the second structure. The outer peripheral surface of the tapered roller 13 is shaped along a conical surface in which the outside diameter increases toward the other side in the roller axial direction. With the second structure, the second clearance K2 can be made smaller than the first clearance K1, and the "second displacement amount" can be made smaller than the "first displacement amount".

Due to the difference in the arrangements of the retainers 40, the cage 14 has the two types of cage pocket 34, that is, the cage pockets 34A and 34B. Although illustration is omitted, the cage 14 may have, due to the difference in the shapes of the retainers 40, the two types of cage pocket 34, that is, the cage pockets 34A and 34B that are different in the permissible amount of the displacement of the tapered roller 13.

As described above, FIG. 5A illustrates the state in which the tapered rollers 13 are arranged along the pitch circle. FIG. 5B illustrates a state in which the tapered rollers 13 are not arranged along the pitch circle and each tapered roller 13 is displaced by the "first displacement amount" or the "second displacement amount". That is, FIG. 5B illustrates a state in which each tapered roller 13 is in contact with the first retainer 40A or the second retainer 40B. In FIG. 5B, the cage 14 is omitted, and the tapered roller 13 in the first cage pocket 34A and the tapered roller 13 in the second cage pocket 34B are hatched and distinguished from each other by varying the density of hatching. In FIG. 5B, Q1 represents an inscribed circle defined by the small-diameter-side portions of the tapered rollers 13 housed in the first cage pockets 34A and being in contact with the first retainers 40A, and Q2 represents an inscribed circle defined by the small-diameter-side portions of the tapered rollers 13 housed in the second cage pockets 34B and being in contact with the second retainers 40B. Since the first displacement amount differs from the second displacement amount as described above, the diameter of the first inscribed circle Q1 differs from the diameter of the second inscribed circle Q2 (diameter of inscribed circle Q1>diameter of inscribed circle Q2). In FIG. 1, the outside diameter (maximum outside diameter) Dc of the small rib 22 of the inner ring 11 may be equal to or smaller than the diameter of the first inscribed circle Q1 and equal to or larger than the diameter of the second inscribed circle Q2. In the present disclosure, however, the outside diameter (maximum outside diameter) Dc is equal to or larger than the diameter of the first inscribed circle Q1 and equal to or larger than the diameter of the second inscribed circle Q2.

As described above, the cage pockets 34 of the cage 14 include the first cage pockets 34A and the second cage pockets 34B. The first cage pocket 34A has the first retainers 40A and 40A. With the first retainers 40A and 40A, the permissible amount of the displacement of the tapered roller 13 housed in the first cage pocket 34A and located along the pitch circle is the first displacement amount. The second cage pocket 34B has the second retainers 40B and 40B. With the second retainers 40B and 40B, the permissible amount of the displacement of the tapered roller 13 housed in the second cage pocket 34B and located along the pitch circle is the second displacement amount smaller than the first displacement amount.

Assembling of Tapered Roller Bearing 10

Figure 8A:
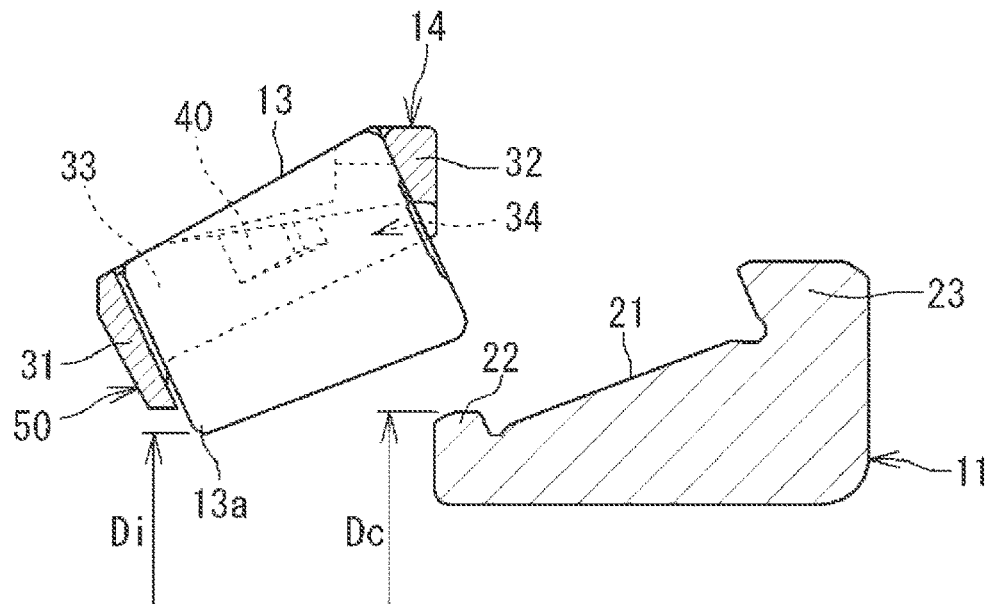
FIG. 8A is an explanatory drawing of a procedure for assembling the tapered roller bearing.
Figure 8B:
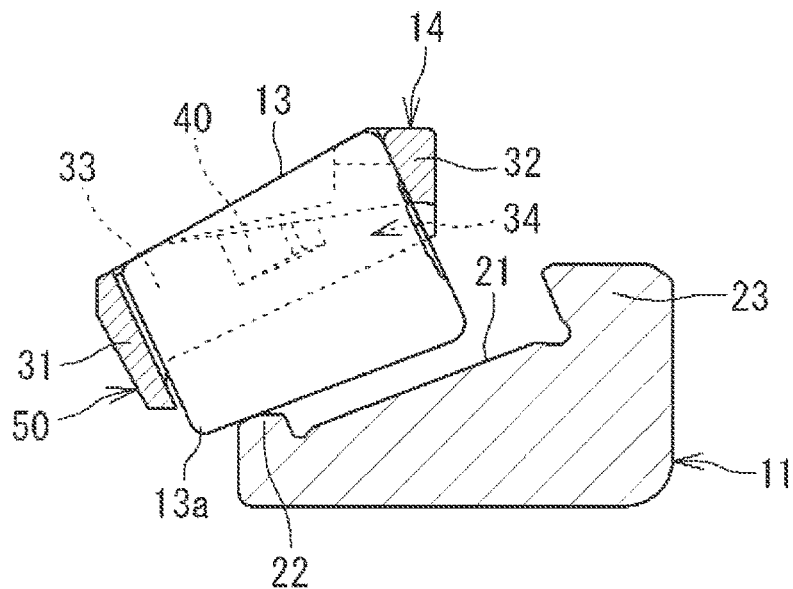
FIG. 8B is an explanatory drawing of the procedure for assembling the tapered roller bearing.

The tapered roller bearing 10 having the structure described above is assembled as follows. As illustrated in FIG. 8A, the tapered rollers 13 are housed in the cage pockets 34 from the inner peripheral side of the cage 14 to assemble the cage 14 and the tapered rollers 13. Thus, the set 50 of the tapered rollers 13 and the cage 14 is obtained. The set 50 is caused to approach the inner ring 11 in the axial direction (see FIG. 8B) to attach the set 50 to the inner ring 11. In the state of the set 50 and at the time of attachment, the retainers 40 and 40 of each cage pocket 34 prevent radially outward detachment of the tapered roller 13 housed in each cage pocket 34.

FIG. 10 is a conceptual diagram for describing positions of the tapered rollers 13 in the first cage pocket 34A and the second cage pocket 34B. As illustrated in FIG. 10 and FIG. 8A, the diameter Di of the inscribed circle defined by the small-diameter-side portions 13a of the tapered rollers 13 located along the pitch circle in the set 50 is smaller than the outside diameter Dc of the small rib 22 of the inner ring 11. A diameter Dj1 of the inscribed circle Q1 defined by the small-diameter-side portions 13a of the tapered rollers 13 in contact with the first retainers 40A (see FIG. 10) and a diameter Dj2 of the inscribed circle Q2 defined by the small-diameter-side portions 13a of the tapered rollers 13 in contact with the second retainers 40B (see FIG. 10) are smaller than the outside diameter Dc of the small rib 22 of the inner ring 11. The small-diameter-side portion 13a of each tapered roller 13 needs to climb over the small rib 22 while assembling the set 50 and the inner ring 11 (see FIG. 8B). Thus, the small-diameter-side portion 13a is displaced radially outward. At this time, a part of the tapered roller 13 is brought into contact with the retainers 40 and 40 of the cage 14. In order that the small-diameter-side portion 13a of the tapered roller 13 may climb over the small rib 22, the inner ring 11 is pushed in the axial direction against the cage 14 to elastically deform a part of the cage 14 (part including the retainers 40).

Figure 9A:
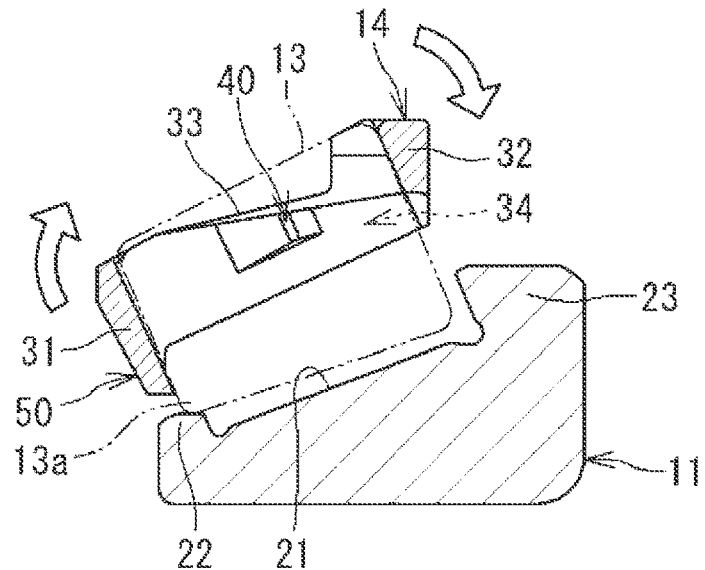
FIG. 9A is an explanatory drawing of the procedure for assembling the tapered roller bearing.

Each cage pocket 34 has the retainers 40 and 40. As illustrated in FIG. 9A, each tapered roller 13 is brought into contact with the retainers 40 and 40, and then pivots clockwise in FIG. 9A about the contact point. That is, the tapered roller 13 pivots to move the small-diameter-side portion 13a radially outward. Through the pivotal displacement of the tapered roller 13, the small-diameter-side portion 13a can easily climb over the small rib 22.

As described above, the cage 14 has the two types of cage pocket 34. As described above, the permissible amount of the displacement with the radial component in the first cage pocket 34A is the first displacement amount. The first displacement amount is larger than the permissible amount of the displacement in the second cage pocket 34B (second displacement amount). That is, the permissible amount of the displacement with the radial component is larger in the tapered roller 13 in the first cage pocket 34A than the tapered roller 13 in the second cage pocket 34B. Therefore, when assembling the set 50 and the inner ring 11, an "elastic deformation amount (see a left part of FIG. 10)" of a part of the cage 14 is small in the first cage pocket 34A, and the tapered roller 13 in the first cage pocket 34A can easily climb over the small rib 22. As a result, the operation for assembling the set 50 and the inner ring 11 is facilitated. Even if the force for pushing the inner ring 11 in the axial direction is small, the small-diameter-side portion 13a of the tapered roller 13 can easily climb over the small rib 22.

Figure 9B:
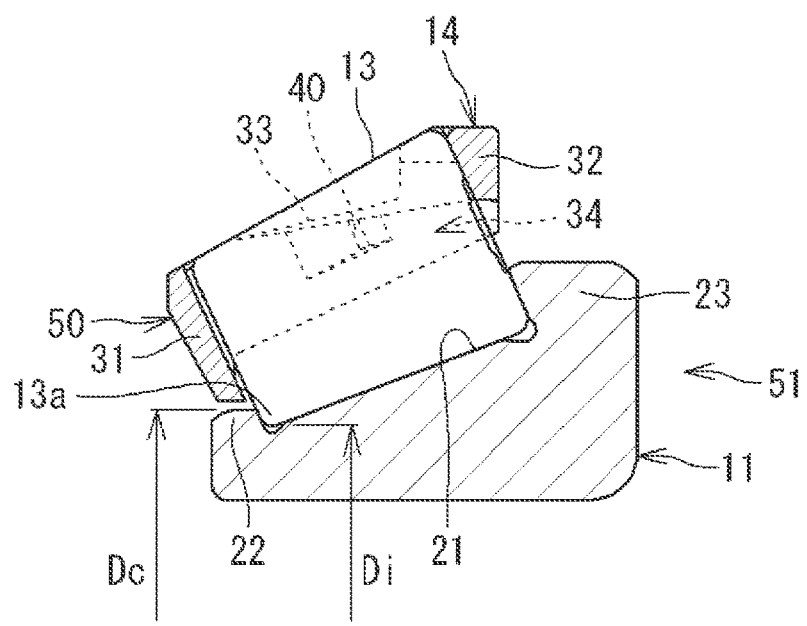
FIG. 9B is an explanatory drawing of the procedure for assembling the tapered roller bearing.

When the set 50 and the inner ring 11 are assembled into the inner ring unit 51 as illustrated in FIG. 9B, the tapered roller 13 in the second cage pocket 34B and the cage 14 are hardly displaced relative to each other. The reason is that the permissible amount of the displacement of the tapered roller 13 with the radial component in the second cage pocket 34B is the second displacement amount smaller than the first displacement amount as illustrated in FIG. 10. That is, in the state of the inner ring unit 51, the second retainers 40B and 40B of the second cage pocket 34B are brought into contact with the tapered roller 13, and therefore the cage 14 is hardly displaced relative to the inner ring 11. Since the cage 14 is hardly displaced relative to the inner ring 11, not only the tapered rollers 13 retained in the second cage pockets 34B of the cage 14 but also the tapered rollers 13 retained in the first cage pockets 34A are hardly displaced in the radial direction as a whole. In order that the tapered roller 13 in the second cage pocket 34B may climb over the small rib 22 in the state of the inner ring unit 51, a great external force is needed to cause a large "elastic deformation amount (see a right part of FIG. 10)" in a part of the cage 14. Therefore, it is difficult for the tapered roller 13 to climb over the small rib 22. As compared to a case where all the cage pockets 34 are the first cage pockets 34A, the tapered rollers 13 housed in the cage pockets 34 hardly detach from the inner ring unit 51, thereby suppressing disintegration of the inner ring unit 51.

In the state of the inner ring unit 51 illustrated in FIG. 9B, when the tapered roller 13 in the cage pocket 34 attempts to make displacement in the radial direction, the displacement is restricted by the retainers 40 and also by the small rib 22 in contact with the tapered roller 13. Therefore, the inner ring unit 51 is hardly disintegrated. Thus, the shape of the small rib 22 (outside diameter Dc) is set so that, even if the tapered roller 13 housed in the cage pocket 34 is displaced with the radial component as described above, the displacement can be restricted through the contact between the tapered roller 13 and the face of the small rib 22.

Through the assembling method described above, the inner ring 11, the cage 14, and the tapered rollers 13 are integrated into the inner ring unit 51. The outer ring 12 is attached to the inner ring unit 51 to complete the tapered roller bearing 10.

Particularly in the present disclosure, the number of second cage pockets 34B is smaller than the number of first cage pockets 34A as illustrated in FIG. 5A. Since the number of second cage pockets 34B is small, the operation for assembling the set 50 and the inner ring 11 is further facilitated. Even though the number of second cage pockets 34B is small, the cage 14 is hardly displaced relative to the inner ring 11. The second cage pockets 34B are arranged away from each other in the circumferential direction with the first cage pockets 34A interposed between the second cage pockets 34B. Therefore, the cage 14 is hardly displaced relative to the inner ring 11 more securely. As a result, the inner ring unit 51 is hardly disintegrated.

Tapered Roller Bearing 10 of Present Disclosure

If all the cage pockets 34 are the second cage pockets 34B in which the permissible amount of the displacement of the tapered roller 13 (second displacement amount) is small, the assembling of the set 50 and the inner ring 11 requires a great force (load). Therefore, the assembling is difficult. If all the cage pockets 34 are the first cage pockets 34A in which the permissible amount of the displacement of the tapered roller 13 (first displacement amount) is large, the tapered rollers 13 and the cage 14 are likely to disintegrate from the inner ring 11 in the state of the inner ring unit 51. In the present disclosure, the cage pockets 34 of the cage 14 include the first cage pockets 34A having the first retainers 40A with which the permissible amount of the displacement is the first displacement amount, and the second cage pockets 34B having the second retainers 40B with which the permissible amount of the displacement is the second displacement amount smaller than the first displacement amount. Therefore, it is possible to achieve both the facilitation of the operation for assembling the inner ring 11 and the set 50 of the cage 14 and the tapered rollers 13, and the suppression of the disintegration of the inner ring unit 51 obtained by assembling the set 50 and the inner ring 11.

In the present disclosure, description is given of the single-row tapered roller bearing 10 having the tapered rollers 13 arrayed in one row in the circumferential direction. Although illustration is omitted, a cage of a multi-row tapered roller bearing may have the structure described above. As another form, in a case where a wheel bearing device (referred to also as "hub unit") configured to support a wheel of an automobile is constituted by a tapered roller bearing, that is, in a case where the wheel bearing device has tapered rollers as rolling elements in part, a cage that retains the tapered rollers may have the structure described above.

Other Features

Figure 11:
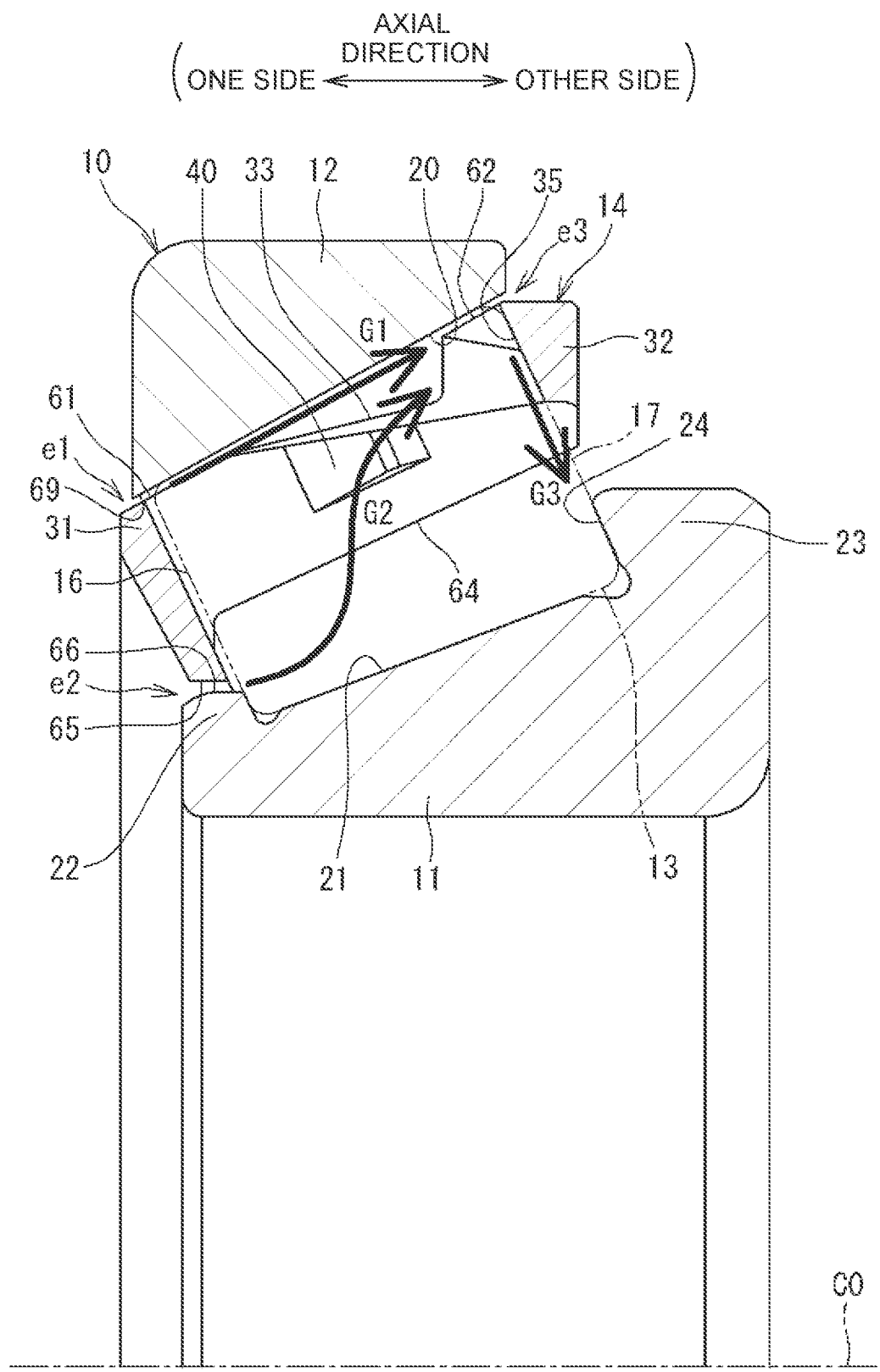
FIG. 11 is a sectional view illustrating the tapered roller bearing of the present disclosure.
Figure 12A:
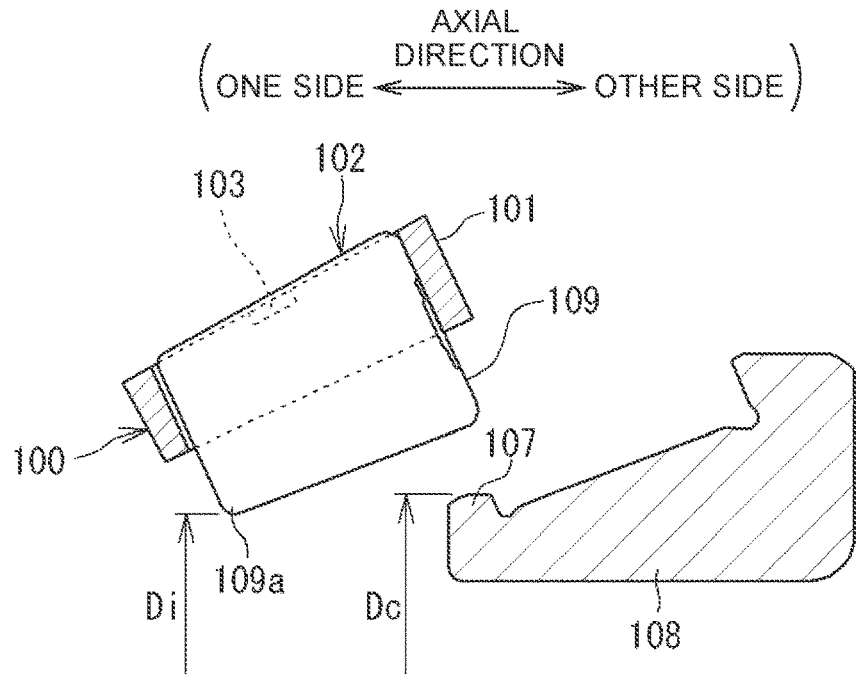
FIG. 12A is an explanatory drawing of a procedure for assembling a tapered roller bearing of related art.
Figure 12B:
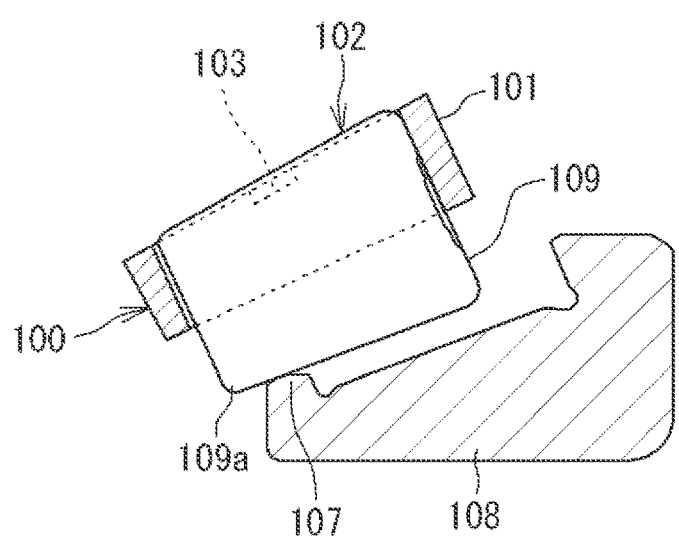
FIG. 12B is an explanatory drawing of the procedure for assembling the tapered roller bearing of the related art.

FIG. 11 is a sectional view illustrating the tapered roller bearing 10 of the present disclosure. FIG. 11 illustrates a cross section different from that in FIG. 1. The tapered roller bearing 10 is lubricated by lubricating oil (oil). When the cage 14 is displaced in the radial direction, the cage 14 can be brought into sliding contact with a part of the inner peripheral surface of the outer ring 12, and accordingly the rotation of the cage 14 is guided by the outer ring 12. That is, the tapered roller bearing 10 is an outer-ring guide type bearing in which the cage 14 is guided by the outer ring 12.

The cage 14 has a first contact surface 61 on the radially outer side and on one side in the axial direction, and a second contact surface 62 on the radially outer side and on the other side in the axial direction. The first contact surface 61 includes a part of the outer peripheral surface of the small-diameter annular body 31. The first contact surface 61 and the second contact surface 62 can be brought into sliding contact with the inner peripheral surface of the outer ring 12, and accordingly the rotation of the cage 14 is guided by the outer ring 12. In a state in which the central lines of the outer ring 12 and the cage 14 coincide with each other as illustrated in FIG. 11, a clearance e1 formed between the first contact surface 61 and an inner peripheral surface 69 of the outer ring 12 on one side in the axial direction is set small for outer-ring guiding. The clearance e1 functions as a labyrinth clearance, which can reduce the occurrence of a case where external lubricating oil on one side in the axial direction of the tapered roller bearing 10 enters an internal space (inside of the tapered roller bearing 10) between the inner ring 11 and the outer ring 12 where the tapered rollers 13 are provided.

As described above, the cage 14 is guided by the outer ring by reducing the clearance e1. Further, a clearance e2 formed between an inner peripheral surface 65 of the small-diameter annular body 31 of the cage 14 and an outer peripheral surface 66 of the small rib 22 of the inner ring 11 is set small. The clearance e2 also functions as a labyrinth clearance. Therefore, external lubricating oil hardly enters the tapered roller bearing 10 from one side in the axial direction through a space between the cage 14 and the inner ring 11. By suppressing the entry of the lubricating oil into the tapered roller bearing 10, resistance to stirring of the lubricating oil during rotation of the tapered roller bearing 10 is reduced. Therefore, a running torque (rotational resistance) of the tapered roller bearing 10 can be reduced.

The lubricating oil passing through the clearances e1 and e2 flows toward the other side of the outer ring 12 in the axial direction as indicated by arrows G1 and G2 in FIG. 11. The cage 14 includes the large-diameter annular body 32 on the other side in the axial direction. The lubricating oil impinges on a face 35 of the large-diameter annular body 32 on one side in the axial direction. Then, the lubricating oil flows with its direction changed toward the inner ring 11 as indicated by an arrow G3. A part of the lubricating oil is supplied between the face 24 of the large rib 23 and the roller large end face 17 of the tapered roller 13. That is, the face 35 of the large-diameter annular body 32 on one side in the axial direction is shaped to change the direction of the flow of the lubricating oil as described above. Further, the lubricating oil passing through the clearance e2 can flow toward the face 24 of the large rib 23 along a radially inner surface 64 of the cage bar 33. Even though the amount of the lubricating oil is small, the lubricating oil is supplied toward the face 24 of the large rib 23 to increase lubricity of the sliding contact surface between the tapered roller 13 and the large rib 23. Thus, seizure can be prevented.

A clearance e3 is provided between the radially outer surface of the cage 14 on the other side in the axial direction (second contact surface 62) and a part of the inner peripheral surface of the outer ring 12. The lubricating oil in the tapered roller bearing 10 is discharged to the outside through the clearance e3. That is, a part of the lubricating oil flowing along the inner peripheral surface of the outer ring 12 flows toward the face 24 of the large rib 23 as described above, and the remaining (surplus) lubricating oil is discharged through the clearance e3. Thus, it is possible to prevent an increase in the stirring resistance of the tapered roller bearing 10 due to the surplus lubricating oil.

The embodiment disclosed herein is illustrative but is not limitative in all respects. The scope of rights of the present disclosure is not limited to the embodiment described above, and encompasses all modifications within the scope of equivalents to the elements in the claims.

What is claimed is:

1. A tapered roller bearing comprising:
   an inner ring having an inner ring raceway on an outer peripheral side, a small rib provided on one side of the inner ring raceway in an axial direction, and a large rib provided on the other side of the inner ring raceway in the axial direction;
   an outer ring having an outer ring raceway on an inner peripheral side;
   a plurality of tapered rollers in rolling contact with the inner ring raceway and the outer ring raceway; and
   an annular cage having a plurality of cage pockets that houses the tapered rollers, respectively, wherein
   each of the cage pockets has a retainer configured to permit displacement of the tapered roller in a direction with a component in a radial direction relative to a central axis of the tapered roller bearing, and restrict detachment of the tapered roller to an outer side in the radial direction by bringing the retainer into contact with a part of an outer peripheral surface of the tapered roller, and
   the cage pockets include:
      a first cage pocket having a first retainer with which a permissible amount of the displacement is a first displacement amount; and
      a second cage pocket having a second retainer with which the permissible amount of the displacement is a second displacement amount smaller than the first displacement amount.

2. The tapered roller bearing according to claim 1, wherein:
   the first retainer has a first clearance in the radial direction from the tapered roller housed in the first cage pocket; and
   the second retainer has a second clearance in the radial direction from the tapered roller housed in the second cage pocket, the second clearance being smaller than the first clearance.

3. The tapered roller bearing according to claim 1, wherein the number of the second cage pockets is smaller than the number of the first cage pockets.

4. The tapered roller bearing according to claim 1, wherein a plurality of the second cage pockets is arranged away from each other in a circumferential direction relative to the central axis of the tapered roller bearing with the first cage pocket interposed between the second cage pockets.

5. The tapered roller bearing according to claim 1, wherein the second retainer is provided on an inner side in the radial direction with respect to the first retainer.

6. The tapered roller bearing according to claim 1, wherein the second retainer is provided on the other side in the axial direction with respect to the first retainer.

7. A cage for a tapered roller bearing including an inner ring having an inner ring raceway on an outer peripheral side, a small rib provided on one side of the inner ring raceway in an axial direction, and a large rib provided on the other side of the inner ring raceway in the axial direction, an outer ring having an outer ring raceway on an inner peripheral side, and a plurality of tapered rollers in rolling contact with the inner ring raceway and the outer ring raceway,
   the cage comprising a plurality of cage pockets that houses the tapered rollers, respectively, wherein
   each of the cage pockets has a retainer configured to permit displacement of the tapered roller in a direction with a component in a radial direction relative to a central axis of the tapered roller bearing, and restrict detachment of the tapered roller to an outer side in the radial direction by bringing the retainer into contact with a part of an outer peripheral surface of the tapered roller, and
   the cage pockets include:
      a first cage pocket having a first retainer with which a permissible amount of the displacement is a first displacement amount; and a second cage pocket having a second retainer with which the permissible amount of the displacement is a second displacement amount smaller than the first displacement amount.

* * * * *